(12) United States Patent
Chu et al.

(10) Patent No.: US 6,934,742 B2
(45) Date of Patent: Aug. 23, 2005

(54) EFFICIENTLY HANDLING CLIENT REQUESTS IN A SERVER FARM

(75) Inventors: Simon Chu, Chapel Hill, NC (US); Richard Alan Dayan, Wake Forest, NC (US)

(73) Assignee: International Business Machines Corporation, Armonk, NY (US)

(*) Notice: Subject to any disclaimer, the term of this patent is extended or adjusted under 35 U.S.C. 154(b) by 688 days.

(21) Appl. No.: 10/093,271

(22) Filed: Mar. 7, 2002

(65) Prior Publication Data

US 2003/0169445 A1 Sep. 11, 2003

(51) Int. Cl.[7] .............................................. G06F 13/14
(52) U.S. Cl. ...................... 709/215; 709/218; 709/203; 711/159; 711/112; 711/173
(58) Field of Search ................................ 709/201, 203, 709/213, 215, 218; 711/111, 112, 147, 170, 173, 159; 714/5, 6; 713/1, 2, 300, 324

(56) References Cited

U.S. PATENT DOCUMENTS

| | | | | |
|---|---|---|---|---|
| 5,652,863 | A | * 7/1997 | Asensio et al. | 711/173 |
| 6,005,678 | A | 12/1999 | Higashida et al. | |
| 6,615,365 | B1 | * 9/2003 | Jenevein et al. | 714/6 |
| 6,636,958 | B2 | * 10/2003 | Abboud et al. | 711/173 |
| 6,665,779 | B1 | * 12/2003 | Polfer et al. | 711/162 |

FOREIGN PATENT DOCUMENTS

| | | |
|---|---|---|
| EP | 858031 A1 * | 8/1998 |
| JP | 10257471 | 9/1998 |
| JP | 2000152207 | 5/2000 |
| JP | 2000284767 | 10/2000 |
| JP | 2000287186 | 10/2000 |
| JP | 2001056796 | 2/2001 |
| JP | 2001078166 | 3/2001 |

* cited by examiner

*Primary Examiner*—B. James Peikari
(74) *Attorney, Agent, or Firm*—Robert A. Voigt, Jr.; Winstead Sechrest & Minick P.C.; Martin McKinley (57) ABSTRACT

A method, system and computer program product for efficiently handling client requests in a server farm. A server in the server farm may comprise a hardfile constrained to activate a limited number of logical partitions. The hardfile may store a partition table that defines the logical partitions activated. An image may refer to a collection of the limited number of logical partitions. Each image may be associated with a web site. Hence, the server may host a web site associated with the image currently active. The server may further store an image definition table storing a listing of images. An image associated with a different web site than the web site hosted may be selected. The logical partitions of the image selected may substitute the logical partitions defined in the partition table. Consequently, the server hosts a different web site without copying the old image or installing the new image.

28 Claims, 8 Drawing Sheets

EFFICIENTLY HANDLING CLIENT REQUESTS IN A SERVER FARM

TECHNICAL FIELD

The present invention relates to the field of hosting Internet web sites, and more particularly to efficiently handling client requests in a server farm by substituting images associated with web sites in a server in the server farm in a timely manner with limited use of bandwidth.

BACKGROUND INFORMATION

Many businesses today are capitalizing on the marketing potential of the quickly expanding Internet by providing web sites that are accessible to users on the Internet. Most of these businesses, however, do not have the funding, expertise or desire to purchase required hardware and software and to set-up and maintain these web sites. These businesses typically turn to companies, such as Internet Service Providers (ISPs), that provide hosting capabilities along with the required technical expertise and equipment to host the business' applications, i.e., software used to run a web site.

The maintaining or running of a web site may commonly be referred to as web site hosting. Web site hosting may be provided by a server or a group of servers within a server farm (large grouping of interconnected servers) to host web sites that provide the particular service of a web site owner. Most businesses utilize the ISP to provide and support their specific Internet applications on a server, which is owned by the ISP. The applications are typically stored on a CD-ROM and manually installed on the server by ISP personnel.

A server farm may be connected to the Internet where one or more of the servers in the server farm each host a business application. A user may access the Internet through a computer commonly referred to as a client. The client may be coupled to the Internet which may be utilized by a user to access the Internet and browse or interact with the application hosted by one or more of the servers in the server farm.

ISPs typically provide a separate server or group of servers for each business application hosted. Multiple servers (or server groups) with different applications are controlled by an ISP and make up the server farm which is "plugged" into the Internet. Each server, including its affiliated software and applications, may be extremely costly to acquire, and thus, ISPs seek to provide efficient utilization of the limited number of available servers.

Each server may comprise a hard disk drive commonly referred to as a "hardfile." The hardfile may be divided into a finite number of logical partitions. The hardfile may be constrained to activate only a limited number of logical partitions, e.g., four partitions. A collection of the limited number of partitions that may be activated, e.g., four partitions, may be referred to as an image. Each image may be associated with a particular web site. For example, one logical partition of the image may store the operating system to coordinate the server and set the standards for a particular business application running on the server. Another logical partition may store the particular business application to operate a particular web site. Another logical partition may store the data collected from that particular web site.

Occasionally, a server hosting a particular web site may be desired to be (temporarily) hosting a different particular web site. This may be due to an inadequate number of servers handling client requests to access and/or interact with an application supported by the server or group of servers. When the web site that a server hosts is changed, i.e., when a server is added to host a particular web site that is hosted by another server or group of servers, the current image activated on that server may have to be deactivated and stored in a storage medium, whether internally or remotely, thereby utilizing network bandwidth. The new image associated with the new web site may then have to be stored onto the hardfile of the server. The server may then be reconfigured and rebooted with the new image. The steps of copying the old image and installing the new image may result in a significant time loss and may also result in the server being temporarily unavailable to users desiring to connect to the server. Furthermore, the steps of copying the old image and installing the new image may result in limiting access to the other interconnected servers in the server farm due to network bandwidth utilization.

It would therefore be desirable to efficiently handle client requests in a server farm by substituting images associated with web sites in a server in the server farm in a timely manner with limited use of bandwidth.

SUMMARY

The problems outlined above may at least in part be solved in some embodiments by an image definition table storing a listing of images that may be activated. An image associated with a different web site than the web site currently hosted by the server may be selected from the image definition table. The logical partitions of the image selected from the image definition table may then substitute the logical partitions of the image currently active in a partition table. The partition table defines the logical partitions of an image activated. The image selected from the image definition table may then be activated. The steps of copying of the old image associated with the former web site hosted as well as installing the new image associated with the new web site hosted may then be avoided. Consequently, a server in a server farm may be updated to host a different web site in a timely manner with limited use of bandwidth.

In one embodiment of the present invention, a method for efficiently handling client requests in a server farm may comprise the step of receiving a request to substitute an image, e.g., image #1, currently active in a server in a server farm as defined in a partition table in a hardfile of the server with another image, e.g., image #2. A hardfile of the server may be constrained to activate only a limited number of logical partitions, e.g. four partitions, as defined in the partition table. A collection of the limited number of logical partitions that may be activated, e.g., four partitions, may be referred to as an image. Each image may be associated with a particular web site. Hence, the server may be configured to host the web site, e.g., www.yahoo.com, associated with the image activated, e.g., image #1.

An image definition table listing images that may be activated may be transmitted to a client coupled to the server to be displayed on the client. The image definition table may reside in either a non-volatile memory of the server or in a special partition in the hardfile.

Upon displaying a listing of the images that may be activated on the client, the server may receive input from the client as to which image in the listing of images is selected to be activated. The image currently active, e.g., image #1, may then be substituted with the new image selected, e.g., image #2, in the partition table. As stated above, the hardfile of the server may be constrained to activate only a limited number of logical partitions, e.g. four partitions, as defined in the partition table. The collection of the limited number of logical partitions that may be activated, e.g., four partitions, may be referred to as an image. Hence, the logical partitions of the image selected to be activated may replace the logical partitions of the image currently active in the partition table.

The server may then receive input from the client as to which particular partition of the image selected to be activated is selected to be booted. The selected image may then become activated thereby allowing the server to host a different web site without copying the old image, e.g., image #1, and installing the new image, e.g., image #2. That is, the server may now host the web site, e.g., www.ibm.com, associated with the substituted image, e.g., image #2, instead of hosting the web site, e.g., www.yahoo.com, associated with the old image, e.g., image #1. The selected image may become activated upon powering down the server, and powering up and rebooting the server, i.e., booting the selected partition of the new image.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
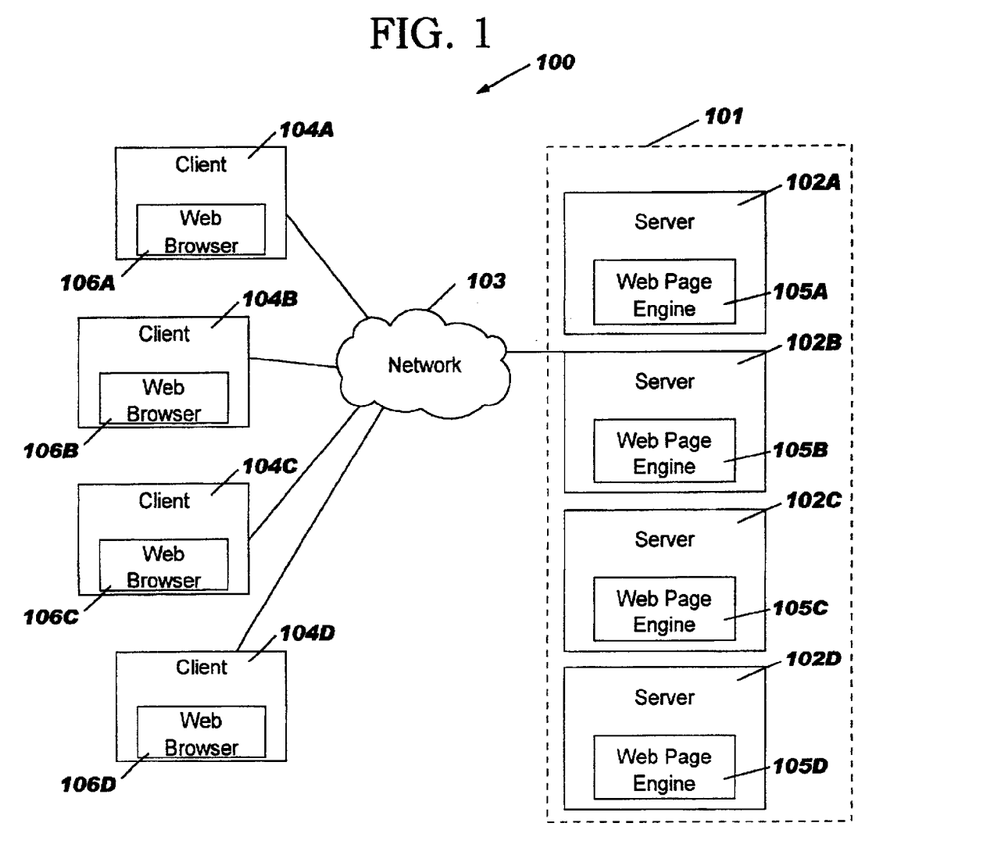
FIG. 1 illustrates a network system configured in accordance with the present invention.

FIG. 1—Network System

FIG. 1 illustrates an embodiment of a network system 100 in accordance with the present invention. Network system 100 may comprise one or more clients 104A–D coupled to a server farm 101 via a network 103. Server farm 101 may comprise a plurality of interconnected servers 102A–D configured to host one or more web sites. Servers 102A–D may collectively or individually be referred to as servers 102 or server 102, respectively. A more detailed description of server 102 is provided further below in conjunction with FIG. 3. Clients 104A–D may be configured to send requests to a server 102 in server farm 101 to access and/or interact with a particular web site hosted by server 102. Clients 104A–D may further be configured to send requests, e.g., request to substitute an image currently active as defined in a partition table, and receive data, e.g., image definition table, in order to substitute the image currently active with another image associated with a different web site in a server in a timely manner with limited use of bandwidth as described in greater detail in FIG. 7. Clients 104A–D may collectively or individually be referred to as clients 104 or client 104, respectively. A more detailed description of client 104 is provided below in conjunction with FIG. 2. Network 103 may be a Local Area Network (LAN), e.g., Ethernet, Token Ring, ARCnet, or a Wide Area Network (WAN), e.g., Internet. It is noted that the Internet may refer to a network of computers. It is further noted that the connection between client 104 and server 102 may be any medium type, e.g., wireless, wired. It is further noted that client 104 may be any type of device, e.g., wireless, Personal Digital Assistant (PDA), cell phone, personal computer system, workstation, Internet appliance, configured with the capability of connecting to network 103 and consequently communicating with server 102. It is further noted that network system 100 may be any type of system that has a server farm and at least one client and that FIG. 1 is not to be limited in scope to any one particular embodiment.

Referring to FIG. 1, servers 102A–D may each comprise a web page engine 105A–D, respectively. Web page engines 105A–D may collectively or individually be referred to as web page engines 105 or web page engine 105, respectively. Web page engine 105 may be configured to maintain and provide access to an Internet web page which is enabled to forward web pages to a web browser, e.g., web browser 106A, of a client 104. Web pages are typically formatted as a markup language file, for example, HyperText Markup Language (HTML) or Extended Markup Language (XML).

Clients 104A–D may each comprise a web browser 106A–D, respectively. Web browsers 106A–D may collectively or individually be referred to as web browsers 106 or web browser 106, respectively. Web browser 106 may be configured for reading and interpreting web pages. While the illustrated client engine is a web browser 106, those skilled in the art will recognize that other client engines may be used in accordance with the principles of the present invention.

Figure 2:
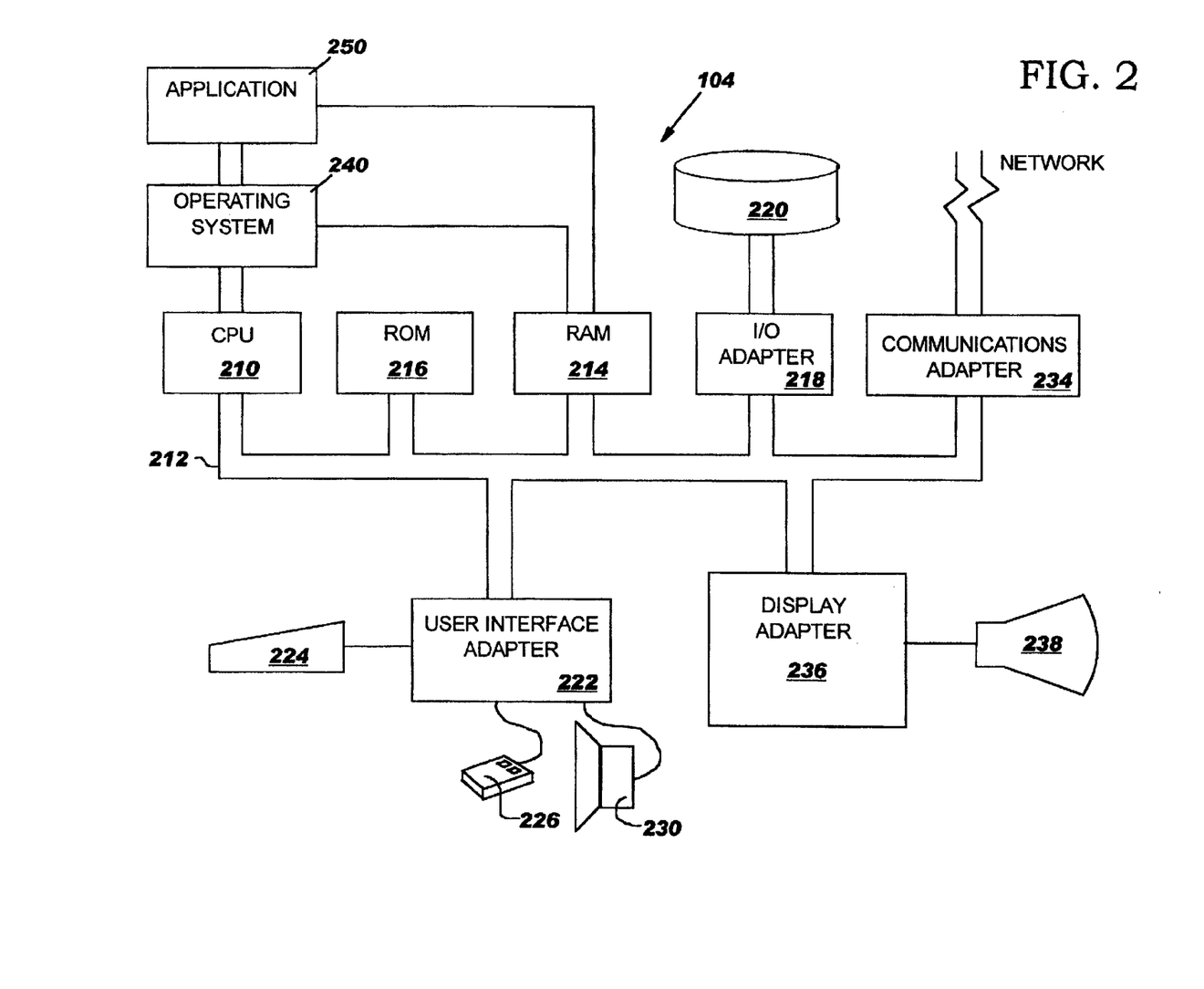
FIG. 2 illustrates an embodiment of the present invention of a client in the network system.

FIG. 2—Hardware Configuration of Client

FIG. 2 illustrates a typical hardware configuration of client 104 which is representative of a hardware environment for practicing the present invention. Client 104 may have a central processing unit (CPU) 210 coupled to various other components by system bus 212. An operating system 240, may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, a program for transmitting requests and input to server 102 as well as displaying received data, e.g., image definition table, from server 102 as described in FIG. 7. Read only memory (ROM) 216 may be coupled to system bus 212 and include a basic input/output system ("BIOS") that controls certain basic functions of client 104. Random access memory (RAM) 214, I/O adapter 218, and communications adapter 234 may also coupled to system bus 212. It should be noted that software components including operating system 240 and application 250 may be loaded into RAM 214 which may be the computer system's main memory for execution. I/O adapter 218 may be a small computer system interface ("SCSI") adapter that communicates with a disk unit 220, e.g., disk drive. It is noted that the program of the present invention that transmits requests and input to server 102 as well as displays received data, e.g., image definition table, from server 102, as described in FIG. 7, may reside in a hidden partition in disk unit 220 or in application 250.

Communications adapter 234 may interconnect bus 212 with an outside network enabling client 104 to communicate with server 102 via network 103 (FIG. 1). Input/Output devices may also be connected to system bus 212 via a user interface adapter 222 and a display adapter 236. Keyboard 224, mouse 226 and speaker 230 may all be interconnected to bus 212 through user interface adapter 222. Event data may be inputted to client 104 through any of these devices. A display monitor 238 may be connected to system bus 212 by display adapter 236. In this manner, a user is capable of inputting, e.g., selecting a new image to be activated from the image definition table, selecting a particular partition of the new image selected to be booted, to client 104 through keyboard 224 or mouse 226 and receiving output from client 104 via display 238.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by client 104, the set of instructions may be stored as a computer program product in another computer memory, for example, in disk drive 220 (which may include a removable memory such as an optical disk or floppy disk for eventual use in disk drive 220). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
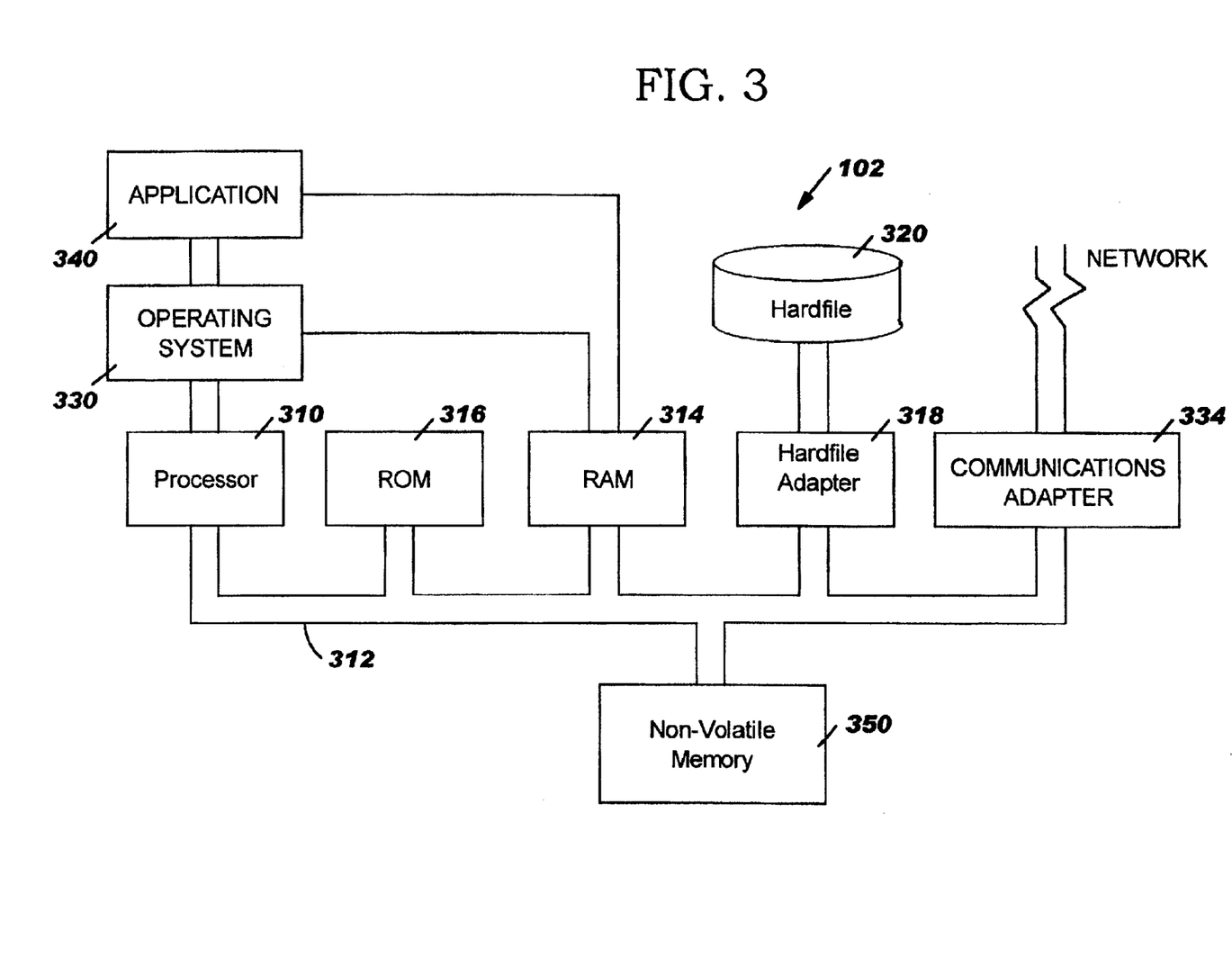
FIG. 3 illustrates an embodiment of the present invention of a server in a server farm.

FIG. 3—Server

FIG. 3 illustrates an embodiment of the present invention of server 102. Referring to FIG. 3, server 102 may comprise a processor 310 coupled to various other components by system bus 312. An operating system 330 may run on processor 310 and provide control as well as coordinate the function of the various components of FIG. 3. An application 340 in accordance with the principles of the present invention may run in conjunction with operating system 330 and provide calls to operating system 330 where the calls implement the various functions or services to be performed by application 340. An application 340 may include, for example, a program for efficiently handling client requests as described in FIG. 7. Read only memory (ROM) 316 may be coupled to system bus 312 and include a Basic Input/Output System ("BIOS") that controls certain basic functions of server 102. Server 102 may further comprise a non-volatile memory 350 coupled to bus 312 where non-volatile memory 350 may be configured to store an extended partition table and an image definition table as discussed further below. Random access memory (RAM) 314 and hardfile adapter 318 may also be coupled to system bus 312. It should be noted that software components including operating system 330 and application 340 may be loaded into RAM 314 which may be the computer system's main memory. Hardfile adapter 318 may be an adapter that communicates with a hardfile 320. It is noted that hardfile adapter 318 and hardfile 320 may be embodied together in a single unit. It is further noted that hardfile adapter 318 and hardfile 320 may be embodied separately as illustrated in FIG. 3. It is further noted that the program of the present invention that efficiently handles client requests as described in FIG. 7 may reside in a hidden partition in hardfile 320 or in application 340.

Hardfile 320 may be divided into a finite number of logical partitions. Hardfile 320 may be constrained to activate only a limited number of logical partitions, e.g., four logical partitions. A collection of the limited number of logical partitions that may be activated, e.g., four partitions, may be referred to as an image. Each image may be associated with a particular web site. Hence, server 102 may host the web site associated with the image activated. For example, one logical partition of the image may store the operating system to coordinate the server and set the standards for a web site hosted by the server. Another logical partition may store the application to operate the web site. Another logical partition may store the data collected from that particular web site. Information about the limited number of logical partitions that are activated, e.g., four partitions, may be stored in a table commonly referred to as a partition table embedded on a particular sector of hardfile 320. A description of a portion of the partition table is described in greater detail in conjunction with FIG. 6. As stated above, hardfile 320 may be constrained to activate only a limited number of logical partitions, e.g., four logical partitions. A user though may partition hardfile 320 into more than the limited number of logical partitions through the addition of a table that may be referred to as an extended partition table as discussed below.

Figure 4:
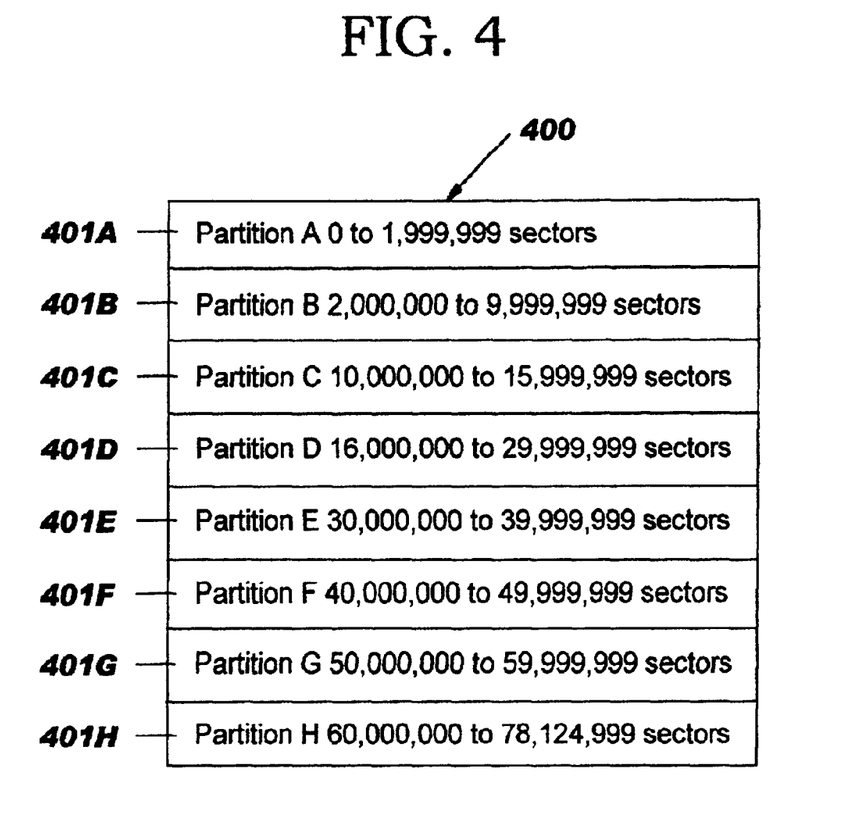
FIG. 4 illustrates an extended partition table configured in accordance with the present invention.

The extended partition table may reside in either non-volatile memory 350 or in a special partition in hardfile 320. The extended partition table may describe the actual physical layout of hardfile 320 including the physical layout of the partitions of hardfile 320 as illustrated in FIG. 4. FIG. 4 illustrates an embodiment of an extended partition table 400. Extended partition table 400 may comprise a plurality of entries 301A–H that are each associated with a particular partition. Entries 401A–H may collectively or individually be referred to as entries 401. Each entry 401 may store the physical layout of a particular partition of hardfile 320 associated with that entry 401. For example, if hardfile 320 had a 40-GigaByte capacity, then extended partition table 400 may describe the physical layout of hardfile 320 as follows. Entry 401A may store the physical layout of partition A in hardfile 320 having a mapping from 0 to 1,999,999 sectors where a sector is 512 bytes. Entry 401B may store the physical layout of partition B in hardfile 320 having a mapping from 2,000,000 to 9,999,999 sectors. Entry 401C may store the physical layout of partition C in hardfile 220 having a mapping from 10,000,000 to 15,999,999 sectors and so forth. It is noted that extended partition table 400 may comprise any number of entries 401 describing any number of partitions of hardfile 320 and that FIG. 4 is illustrative. Additional details regarding the extended partition table allowing a user to partition hardfile 320 into more than the limited number of logical partitions are disclosed in U.S. patent application Ser. No. 10/093,261 filed on Mar. 7, 2002, entitled "Method and Apparatus to Extend a Hardfile Partition Table," which is hereby incorporated herein by reference in its entirety.

Figure 5:
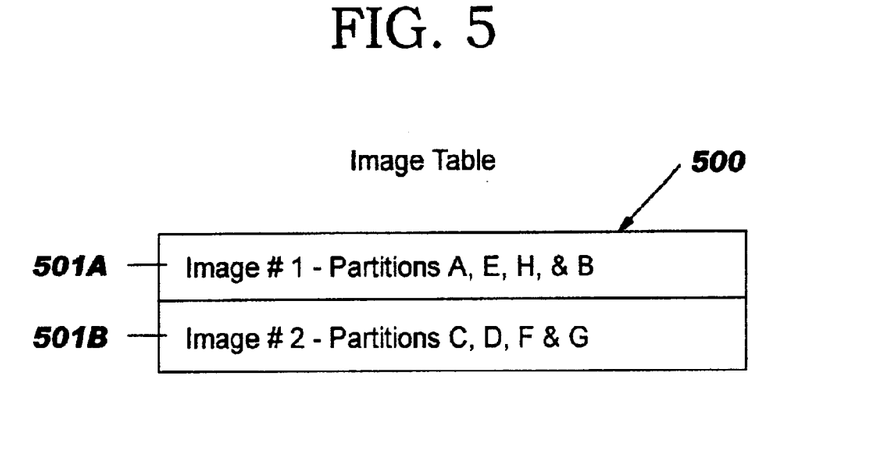
FIG. 5 illustrates an image definition table configured in accordance with the present invention.

As stated above, the limited number of logical partitions that may be activated, e.g., four partitions, may be referred to as an image. Each image may be associated with a particular web site. The partitions identified in the extended partition table may be mapped into multiple images that may be defined in a table referred to as an image definition table. The image definition table may reside in either non-volatile memory 350 or in a special partition in hardfile 320. The image definition table may define particular images that are associated with particular web sites as illustrated in FIG. 5. FIG. 5 illustrates an embodiment of an image definition table 500. Image definition table 500 may comprise one or more entries 501A–B that each store a definition of a particular image. Entries 501A–B may collectively or individually be referred to as entries 501 or entry 501, respectively. Each entry 501 may define the limited number of partitions, e.g., four partitions, as described in extended partition table 400 that comprise a particular image. For example, entry 501A may define image #1 comprising partitions A, E, H and B as defined in extended partition table 400. Entry 501B may define image #2 comprising partitions C, D, F and G as defined in extended partition table 400. It is noted that image definition table 500 may comprise any number of entries 501 defining any number of images and that FIG. 5 is illustrative. Additional details regarding the image definition table defining the images are disclosed in U.S. patent application Ser. No. 10/093,261 filed on Mar. 7, 2002, entitled "Method and Apparatus to Extend a Hardfile Partition Table."

Figure 6:
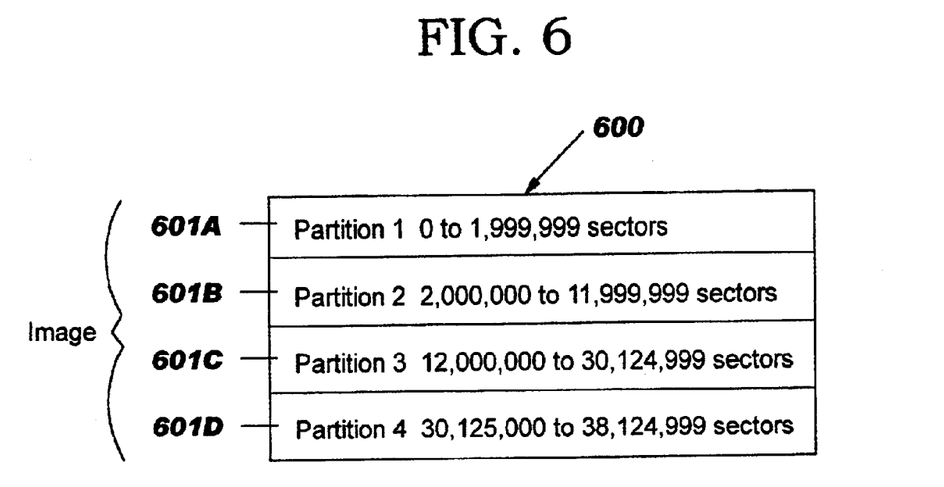
FIG. 6 illustrates a portion of a partition table configured in accordance with the present invention.

Referring to FIGS. 3 and 5, hardfile adapter 318 may be configured to map the partitions of an image selected in image definition table 500 to a partition table in order to activate the selected image as illustrated in FIG. 6. FIG. 6 illustrates an embodiment of the present invention of a portion of a partition table 600 that stores the limited number of logical partitions to be activated, e.g., four partitions. That is, partition table 600 may store the image, e.g., image #1, to be activated. The portion of partition table 600 may comprise a limited number of entries 601A–D corresponding to the limited number of logical partitions that may be activated, e.g., four entries. Entries 601A–D may collectively or individually be referred to as entries 601 or entry 601, respectively. Each entry 601 may store a description of one of the logical partitions of the image activated. For example, if image #1 is to be activated, where image #1 is defined to comprise partitions A, E, H and B in image definition table 500, then entry 601A may define partition A as partition 1 having a mapping from 0 to 1,999,999 sectors in hardfile 320 where a sector is 512 bytes. Entry 601B may define partition E as partition 2 having a mapping from 2,000,000 to 11,999,999 sectors in hardfile 320. Entry 601C may define partition H as partition 3 having a mapping from 12,000,000 to 30,124,999 sectors in hardfile 320. Entry 601D may define partition B as partition 4 having a mapping from 30,125,999 to 38,124,999 sectors in hardfile 320. Consequently, hardfile 320 may appear to comprise 38,125,000 sectors, consecutively and sequentially addressable, with respect to operating system 330 and application 340 where in actuality hardfile 320 comprises 78,125,000 sectors of addressable space. Additional details regarding the partition table that stores information about the image activated, i.e., the limited number of logical partitions to be activated, are disclosed in U.S. patent application Ser. No. 10/093,261 filed on Mar. 7, 2002, entitled "Method and Apparatus to Extend a Hardfile Partition Table."

Referring to FIG. 3, communications adapter 334 may also be coupled to system bus 312. Communications adapter 334 may interconnect bus 312 with an outside network enabling server 102 to communicate with client 104 via a Local Area Network (LAN), e.g., Ethernet, Token Ring, ARCnet or a Wide Area Network (WAN), e.g., Internet.

Implementations of the invention include implementations as a computer system programmed to execute the method or methods described herein, and as a computer program product. According to the computer system implementations, sets of instructions for executing the method or methods may be resident in the random access memory 314 of one or more computer systems configured generally as described above. Until required by server 102, the set of instructions may be stored as a computer program product in another computer memory, for example, in hardfile 320. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 7:
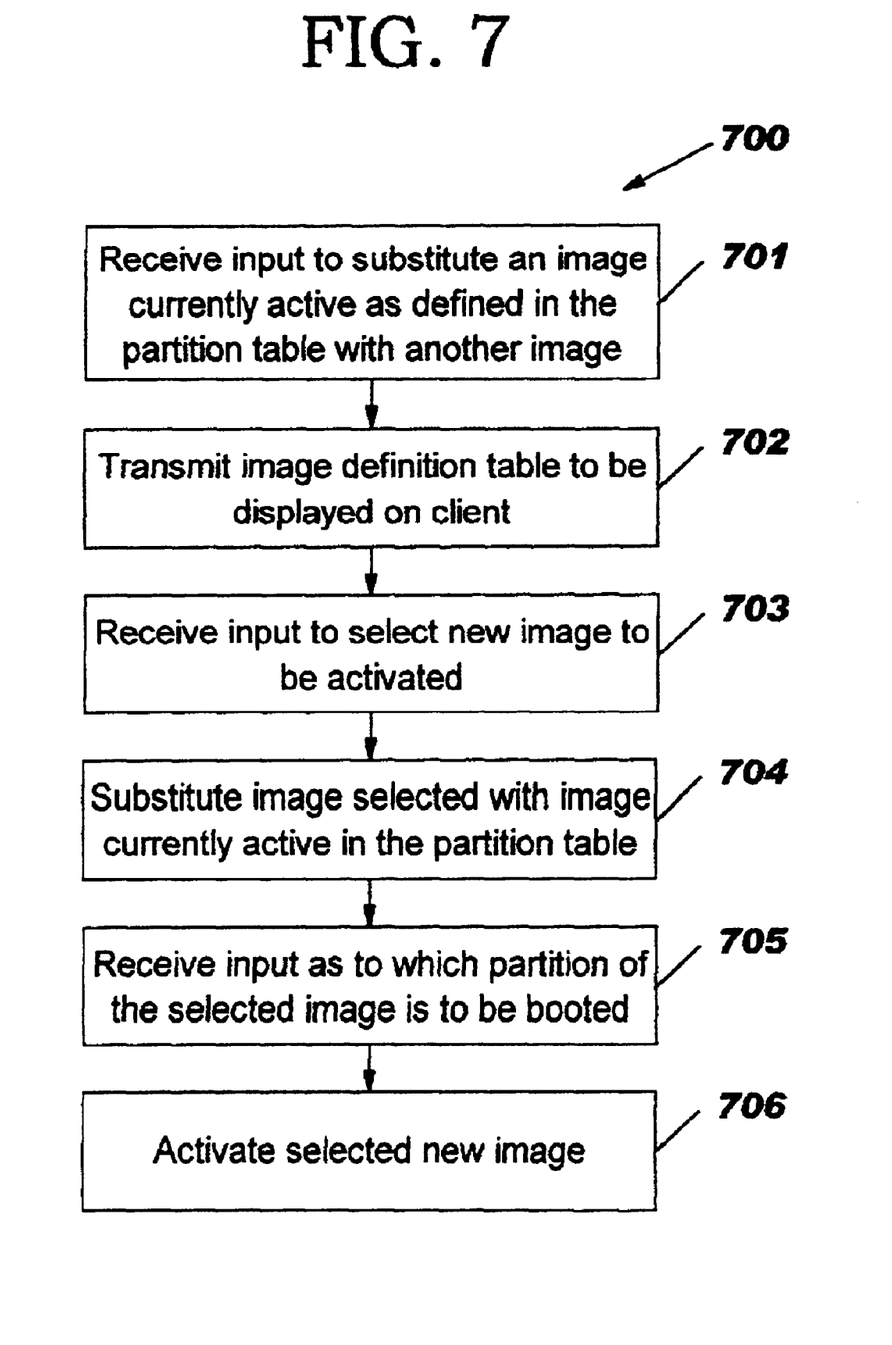
FIG. 7 is a flowchart of a method for efficiently handling client requests in a server farm in accordance with the present invention.

FIG. 7—Flowchart of a Method for Efficiently Handling Client Requests in a Server Farm FIG. 7 is a flowchart of one embodiment of the present invention of a method 700 for efficiently handling client requests in a server farm. As stated in the Background Information section, a server hosting a particular web site may be desired to be (temporarily) hosting a different particular web site. This may be due to an inadequate number of servers handling client requests to access and/or interact with an application supported by the server or group of servers. When the web site that a server hosts is changed, i.e., when a server is added to host a particular web site that is hosted by another server or group of servers, the current image activated on that server may have to be deactivated and stored in a storage medium whether internally or remotely thereby utilizing network bandwidth. The new image associated with the new web site may then have to be stored onto the hardfile of the server. The server may then be reconfigured and rebooted with the new image. The steps of copying the old image and installing the new image may result in a significant time loss and may also result in the server being temporarily unavailable to users desiring to connect to the server. Furthermore, the steps of copying the old image and installing the new image may result in limiting access to the other interconnected servers in the server farm due to network bandwidth utilization. It would therefore be desirable to efficiently handle client requests in a server farm by substituting images associated with web sites in a server in the server farm in a timely manner with limited use of bandwidth. Method 700 is a method for efficiently handling client requests in a server farm by substituting images associated with web sites in a server in the server farm in a timely manner with limited use of bandwidth.

Referring to FIG. 7, in step 701, server 102 (FIG. 2) in server farm 101 (FIG. 1) may receive a request to substitute an image currently active as defined in partition table 600 (FIG. 6), e.g., image #1, with another image, e.g., image #2, from client 104. As stated above, hardfile 320 (FIG. 3) of server 102 may be constrained to activate only a limited number of logical partitions, e.g. four partitions, as defined in partition table 600 (FIG. 6). A collection of the limited number of logical partitions that may be activated, e.g., four partitions, may be referred to as an image. Each image may be associated with a particular web site. Hence, server 102 may be configured to host the web site, e.g., www.yahoo.com, associated with the image activated, e.g., image #1. One logical partition of the image may store the operating system to coordinate the server and set the standards for the web site hosted by the server. Another logical partition of the image may store the application to operate the web site. Another logical partition of the image may store the data collected from that particular web site.

In step 702, image definition table 500 (FIG. 5) may be transmitted by server 102 to client 104 to be displayed on display 238 (FIG. 2) of client 104 comprising a listing of images available to be activated on server 102. In step 703, server 102 may receive input to select the new image, e.g., image #2, to be activated from client 104.

In step 704, the image currently active, e.g., image #1, may be substituted with the new image selected in step 703, e.g., image #2, in partition table 600 (FIG. 6). For example, if image #1 was the image currently active, then partition table 600 may comprise entries 601 defining logical partitions that comprise image #1, e.g., partitions A, E, H & B, as illustrated in FIG. 6. If image #2 was the image selected to substitute image #1, then partition table 600 may be updated so that entries 601 define partitions that comprise image #2, e.g., partitions C, D, F and G.

In step 705, server 102 may receive input from client 104 as to which particular partition in the updated partition table 600, i.e., which particular partition of the image selected in step 703, may be marked or selected. The partition selected may be the partition in the new image booted as discussed further below.

In step 706, the image selected in step 703 may become activated thereby allowing server 102 to host a different web site without copying the old image, e.g., image #1, and installing the new image, e.g., image #2. That is, server 102 may now host the web site, e.g., www.ibm.com, associated with the substituted image, e.g., image #2, instead of hosting the web site, e.g., www.yahoo.com, associated with the old image, e.g., image #1. Step 706 may comprise sub-steps as illustrated in FIG. 8.

Figure 8:
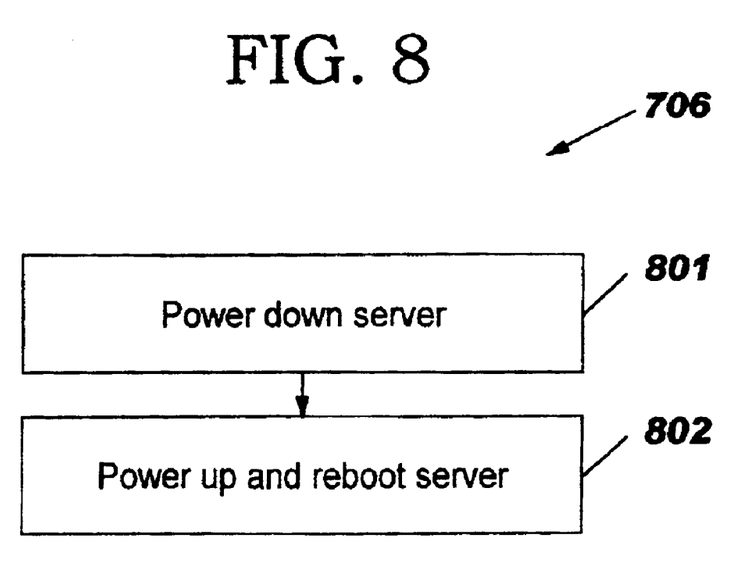
FIG. 8 is a flowchart of the sub-steps of the step of activating an image selected to substitute an image defined in the partition table in accordance with the present invention.

Referring to FIG. 8, the image selected in step 703, e.g., image #2, may be activated by powering down server 102 in step 801, and powering up and rebooting server 102, i.e., booting the partition selected in step 705, in step 802.

As stated above, a server in a server farm hosting a particular web site may be desired to be (temporarily) hosting a different particular web site. This may be due to an inadequate number of servers handling client requests to access and/or interact with the web site hosted by the server or group of servers in the server farm. Since a server may store definitions of images associated with different web sites in an image definition table 500 (FIG. 5), copying of the old image associated with the former web site hosted as well as installing the new image associated with the new web site hosted may be avoided. Consequently, a server in a server farm may be updated to host a different web site in a timely manner with limited use of bandwidth.

It is noted that method 700 may be executed in a different order presented and that the order presented in the discussion of FIG. 7 is illustrative. It is further noted that certain steps in method 700 may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for handling client requests in a server farm comprising the steps of:

receiving input to substitute a first image with a second image in a server of said server farm, wherein said first image and said second image comprise a limited number of partitions of a plurality of partitions of a hardfile in said server, wherein said first image comprises a first combination of said limited number of partitions of said plurality of partitions of said hardfile, wherein said second image comprises a second combination of said limited number of partitions of said plurality of partitions of said hardfile, wherein said hardfile stores a first table configured to indicate an active image, wherein said first table stores said first image indicating said first image is active;

receiving input to select said second image to be activated;

substituting said first image with said second image in said first table to indicate that said second image is to be activated; and activating said second image.

2. The method as recited in claim 1 further comprising the step of:

transmitting a second table to a client coupled to said server to be displayed on said client, wherein said second table comprises a list of images stored in said hardfile, wherein said list of images comprises said first image and said second image, wherein said second image is selected to be activated from said second table.

3. The method as recited in claim 1, wherein said step of activating said second image comprises the steps of:

powering down said server; and powering up and rebooting said server.

4. The method as recited in claim 1, wherein said limited number of partitions comprises a partition storing an operating system.

5. The method as recited in claim 1, wherein said limited number of partitions comprises a partition storing an application to run a web site.

6. The method as recited in claim 1, wherein said limited number of partitions comprises a partition storing data collected from said web site.

7. The method as recited in claim 1, wherein said first image is associated with a first web site, wherein said second image is associated with a second web site.

8. A system, comprising:

a plurality of servers comprising a server farm;

wherein a server of said server farm comprises:

a memory unit operable for storing a computer program operable for handling client requests in said server farm;

a hardfile coupled to said memory unit, wherein said hardfile comprises a plurality of partitions configured to store data, wherein each image comprises a limited number of partitions of said plurality of partitions of said hardfile, wherein said hardfile stores a first table configured to indicate an active image, wherein said first table stores a first image indicating said first image is active; and a processor coupled to said memory unit and to said hardfile, wherein said processor, responsive to said computer program, comprises:

circuitry operable for receiving input to substitute said first image with a second image, wherein said first image comprises a first combination of said limited number of partitions of said plurality of partitions of said hardfile, wherein said second image comprises a second combination of said limited number of partitions of said plurality of partitions of said hardfile;

circuitry operable for receiving input to select said second image to be activated;

circuitry operable for substituting said first image with said second image in said first table to indicate that said second image is to be activated; and circuitry operable for activating said second image.

9. The system as recited in claim 8, wherein said processor further comprises:

circuitry operable for transmitting a second table to a client coupled to said server to be displayed on said client, wherein said second table comprises a list of images stored in said hardfile, wherein said list of images comprises said first image and said second image, wherein said second image is selected to be activated from said second table.

10. The system as recited in claim 8, wherein said circuitry operable for activating said second image further comprises:

circuitry operable for powering down said server; and circuitry operable for powering up and rebooting said server.

11. The system as recited in claim 8, wherein said limited number of partitions comprises a partition storing an operating system.

12. The system as recited in claim 8, wherein said limited number of partitions comprises a partition storing an application to run a web site.

13. The system as recited in claim 8, wherein said limited number of partitions comprises a partition storing data collected from said web site.

14. The system as recited in claim 8, wherein said first image is associated with a first web site, wherein said second image is associated with a second web site.

15. A system, comprising:

a plurality of servers comprising a server farm;

wherein a server of said server farm comprises:

a hardfile configured to store data, wherein said hardfile comprises a plurality of partitions, wherein each image comprises a limited number of partitions of said plurality of partitions of said hardfile, wherein said hardfile stores a first table configured to indicate an active image, wherein said first table stores a first image indicating said first image is active;

means for receiving an input to substitute said first image with a second image, wherein said first image comprises a first combination of said limited number of partitions of said plurality of partitions of said hardfile, wherein said second image comprises a second combination of said limited number of partitions of said plurality of partitions of said hardfile;

means for receiving input to select said second image to be activated;

means for substituting said first image with said second image in said first table to indicate that said second image is to be activated; and means for activating said second image.

16. The system as recited in claim 15, wherein said server further comprises:

means for transmitting a second table to client coupled to said server to be displayed on said client, wherein said second table comprises a list of images stored in said hardfile, wherein said list of images comprises said first image and said second image, wherein said second image is selected to be activated from said second table.

17. The system as recited in claim 15, wherein said means for activating said second image further comprises:

means for powering down said server; and means for powering up and rebooting said server.

18. The system as recited in claim 15, wherein said limited number of partitions comprises a partition storing an operating system.

19. The system as recited in claim 15, wherein said limited number of partitions comprises a partition storing an application to run a web site.

20. The system as recited in claim 15, wherein said limited number of partitions comprises a partition storing data collected from said web site.

21. The system as recited in claim 15, wherein said first image is associated with a first web site, wherein said second image is associated with a second web site.

22. A computer program product embodied in a machine readable medium for handling client requests in a server farm comprising the programming steps of:

receiving input to substitute a first image with a second image in a server of said server farm, wherein said first image and said second image comprise a limited number of partitions of a plurality of partitions of a hardfile in said server, wherein said first image comprises a first combination of said limited number of partitions of said plurality of partitions of said hardfile, wherein said second image comprises a second combination of said limited number of partitions of said plurality of partitions of said hardfile, wherein said hardfile stores a first table configured to indicate an active image, wherein said first table stores said first image indicating said first image is active;

receiving input to select said second image to be activated;

substituting said first image with said second image in said first table to indicate that said second image is to be activated; and activating said second image.

23. The computer program product as recited in claim 22 further comprising the programming step of:

transmitting a second table to a client coupled to said server to be displayed on said client, wherein said second table comprises a list of images stored in said hardfile, wherein said list of images comprises said first image and said second image, wherein said second image is selected to be activated from said second table.

24. The computer program product as recited in claim 22, wherein said programming step of activating said second image comprises the programming steps of:

powering down said server; and powering up and rebooting said server.

25. The computer program product as recited in claim 22, wherein said limited number of partitions comprises a partition storing an operating system.

26. The computer program product as recited in claim 22, wherein said limited number of partitions comprises a partition storing an application to run a web site.

27. The computer program product as recited in claim 22, wherein said limited number of partitions comprises a partition storing data collected from said web site.

28. The computer program product as recited in claim 22, wherein said first image is associated with a first web site, wherein said second image is associated with a second web site.

* * * * *